US005553533A

United States Patent [19]
Loechtenfeldt et al.

[11] Patent Number: 5,553,533
[45] Date of Patent: Sep. 10, 1996

[54] FLOUR DUSTER

[75] Inventors: Christopher J. Loechtenfeldt, Cincinatti; Bernardus W. Muller, Loveland, both of Ohio

[73] Assignee: Interko, Inc., Blythewood, S.C.

[21] Appl. No.: 327,358

[22] Filed: Oct. 21, 1994

[51] Int. Cl.⁶ .................................................. A23B 4/02
[52] U.S. Cl. ........................................ 99/494; 118/19
[58] Field of Search .............................. 99/494; 118/13, 118/19, 77, 76, 322, 309

[56] References Cited

U.S. PATENT DOCUMENTS

| | | | |
|---|---|---|---|
| 4,210,074 | 7/1980 | Laughman | 99/494 |
| 4,448,116 | 5/1984 | Muzzarelli | 99/494 |
| 4,715,315 | 12/1987 | Burford | 99/494 |
| 5,160,377 | 11/1992 | Montemayor et al. | 99/494 |
| 5,165,331 | 11/1992 | Hayashi et al. | 99/494 |

*Primary Examiner*—David Scherbel
*Assistant Examiner*—Reginald L. Alexander
*Attorney, Agent, or Firm*—Handal & Morofsky

[57] ABSTRACT

There is provided a flour duster having a bin for containing flour, the bin having a bottom, a conveyor belt having a top surface and an underside, the bottom of the bin being formed by the top surface of the conveyor belt, structure is provided for supporting the bin and the conveyor belt, a drive member coupled to the conveyor belt for rotating the conveyor belt to drag flour from the bin toward the underside of the conveyor belt and disperse the flour.

19 Claims, 8 Drawing Sheets

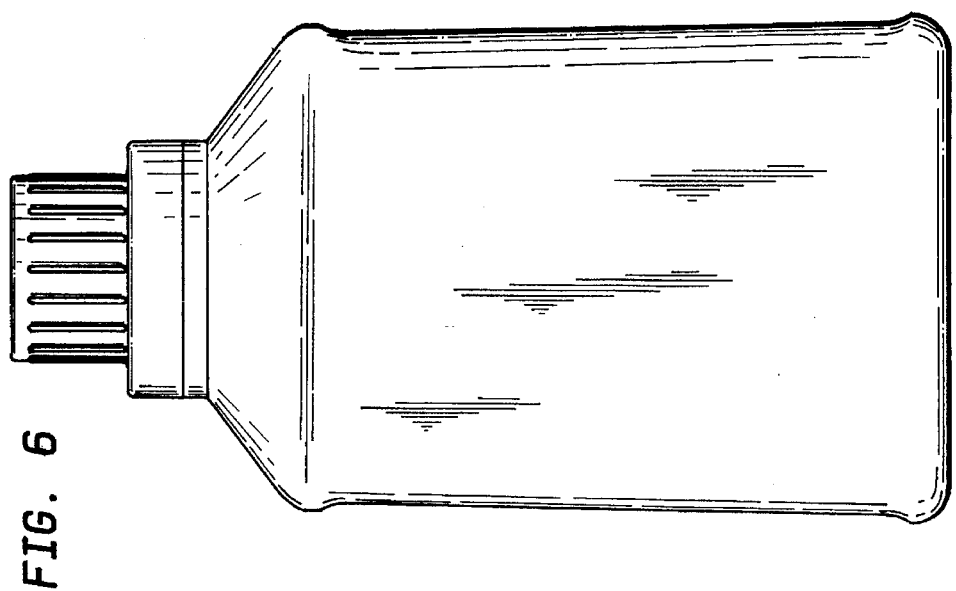
FIG. 6
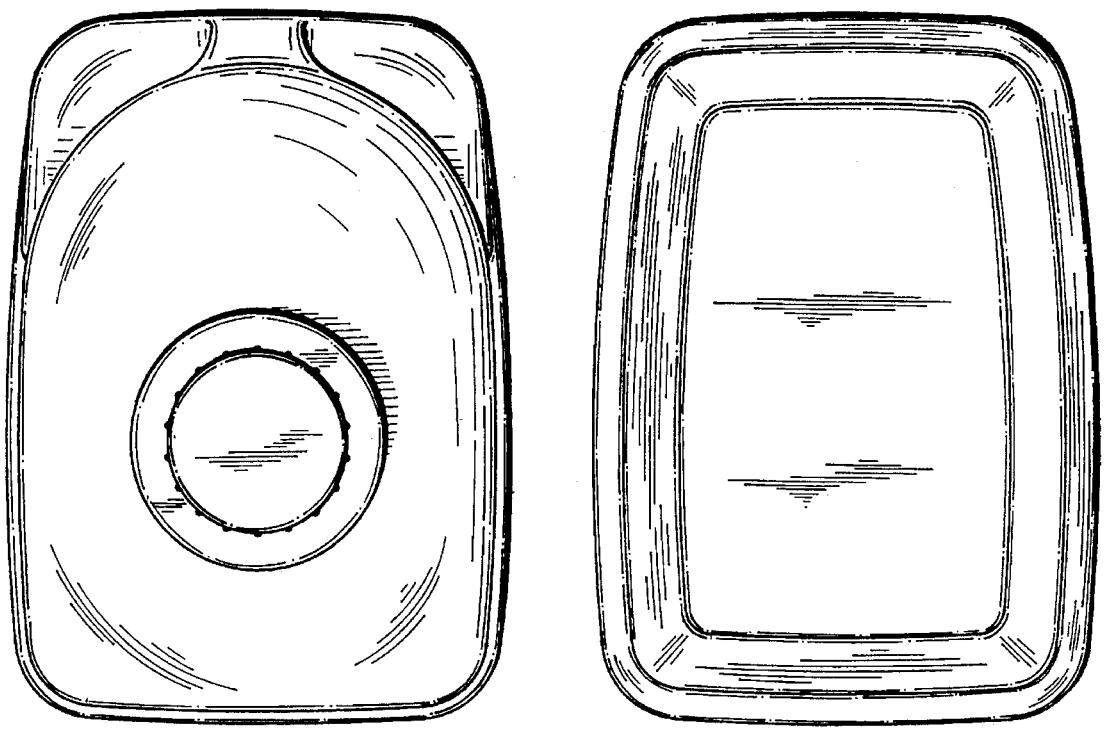
FIG. 4
FIG. 5

FLOUR DUSTER

TECHNICAL FIELD

The present invention relates to the field of devices for applying thin coatings of flour, poppy seed, or the like to a continuous ribbon of dough extruded by a calendar-type or other machine for the purpose of improving the ease of handling of the dough.

BACKGROUND ART

Prior art systems feed loose flour onto the dough sheet by means of such devices as coarse rollers which form the bottom wall of a flour bin and rotate to force flour out, or putting flour through a screen using eccentric shaking rods and brushes and grooved rollers.

SUMMARY OF THE INVENTION

The inventive system achieves flour dusting by means of a profiled, punched or grooved conveyor working in cooperation with a flour bin. The large area of the system provides for particularly advantageous operation.

BRIEF DESCRIPTION OF THE DRAWINGS

One way of carrying out the invention is described in detail below with reference to drawings which illustrate only one specific embodiment of the invention and in which.

DETAILED DESCRIPTION OF THE PREFERRED EMBODIMENTS

Figure 1:
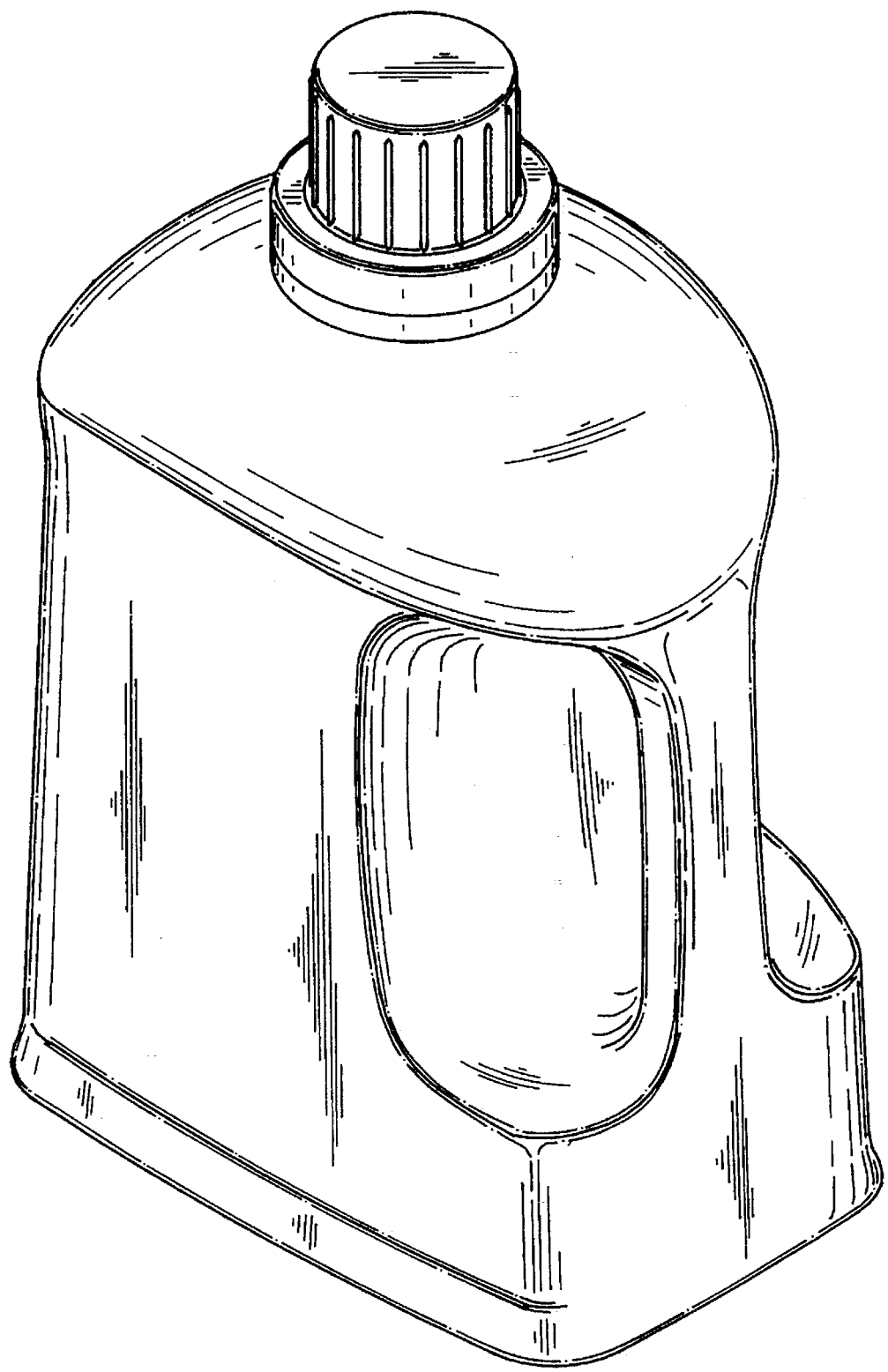
FIG. 1 is a schematic representation of a flour duster constructed in accordance with the present invention.
Figure 3:
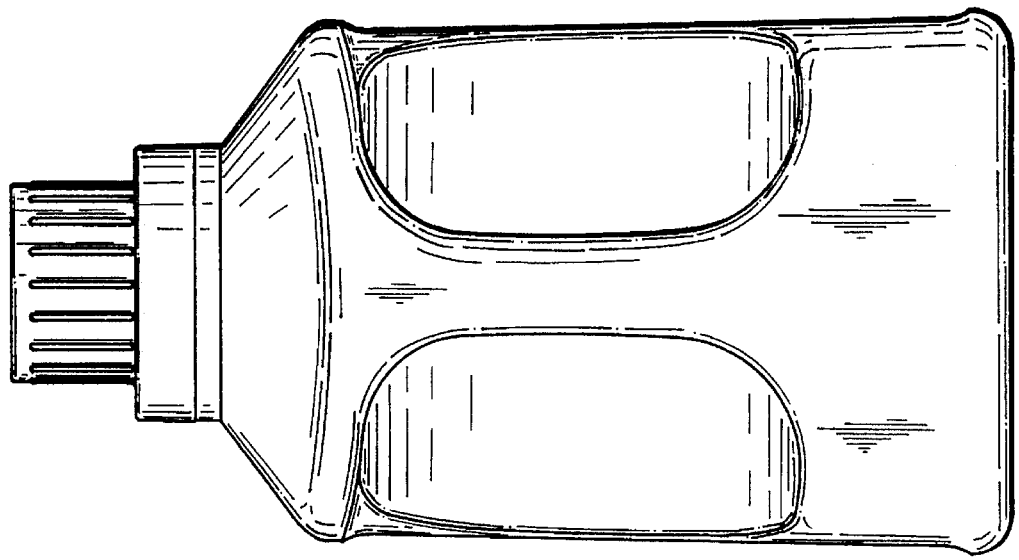
FIG. 3 is a top plan view of the duster of FIG. 2.

The principles of a flour duster 10 constructed in accordance with the present invention may be seen with reference to FIG. 1. In particular, flour duster 10 comprises a bin 12 which contains a quantity of flour 14. The bin is generally comprised of four side walls and contain the flour. The bottom of the bin is formed by a conveyor belt 16 which has a number of grooves 18 cut into its surface. Conveyor belt 16 is supported on a pair of rollers 20 and 22. Rollers 20 and 22 support conveyor belt 16 for rotation in the direction indicated by arrow 24.

Rigidity of the upper portion 26 of conveyor belt 16 is maintained by a rigid support plate 28 positioned beneath upper surface 26. Excessive accumulation on conveyor belt 16 of flour 14 is prevented by a gate 30 whose position may be adjusted to be just barely removed from contact with or even in contact with the grooved upper surface 26 of conveyor belt 16.

Notwithstanding the action of gate 30, some small amount of excess flour may accumulate on conveyor belt 16 as it exits gate 30. This flour is removed by a doctor blade 32 which removes this excess flour and sends it off in the directions indicated by arrows 34. This flour then hits round support 36 causing the flour to be further dispersed in the directions indicated by arrows 38.

From round support 36, the flour then falls onto the passing ribbon of extruded or calendared dough 40 which is moving in the direction indicated by arrow 42.

Insofar as doctor blade 32 only scrapes against the top surface of conveyor belt 16, the flour in the grooves 18 begins to fall both before reaching the doctor blade in the directions indicated by arrows 44 and after passing doctor blade 32 will continue falling in the directions indicated by arrows 46. It is noted that the direction indicated by arrow 46 is not straight down, insofar as the flour has a movement vector parallel to the movement of the lower surface 48 of conveyor belt 16. The result of all of this is a dusting of flour on extruded ribbon of dough 40 in and accumulation of such dusted flour 50 on the dough ribbon.

Figure 2:
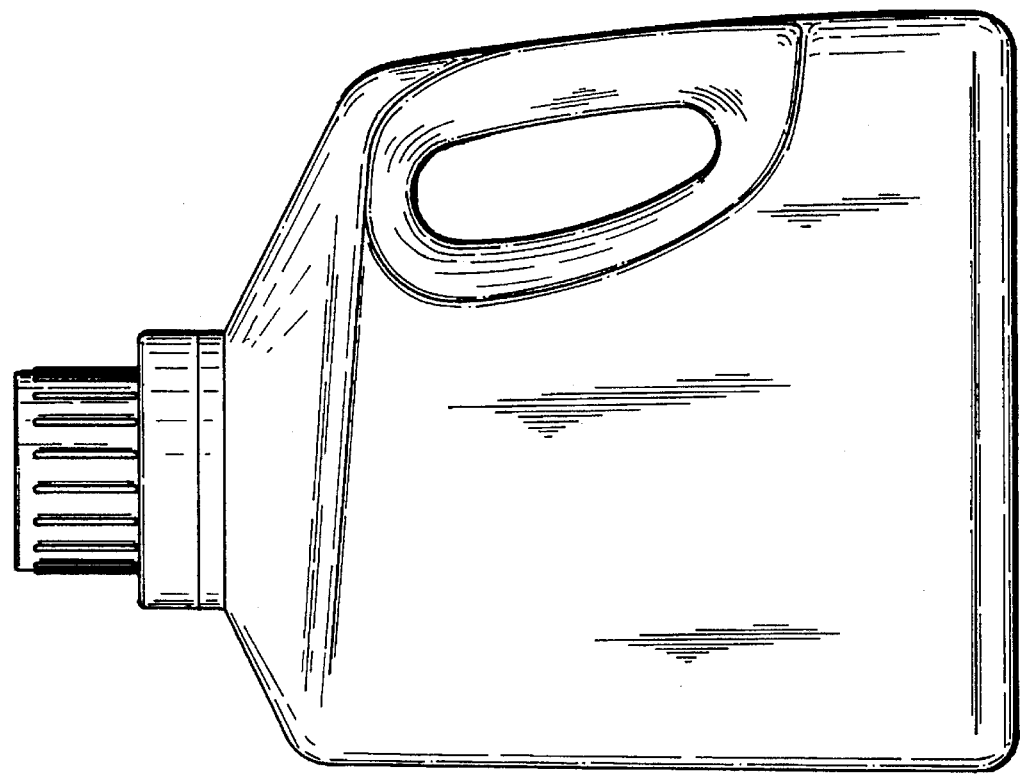
FIG. 2 is a perspective view illustrating the construction of a flour duster constructed in accordance with the present invention.
Figure 4:
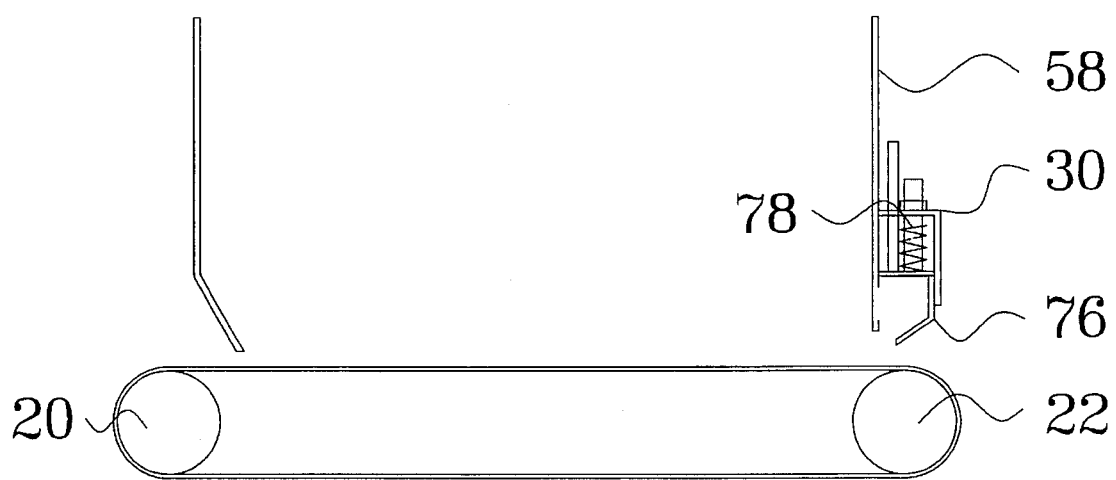
FIG. 4 is a view along lines 4—4 of FIG. 3.
Figure 5:
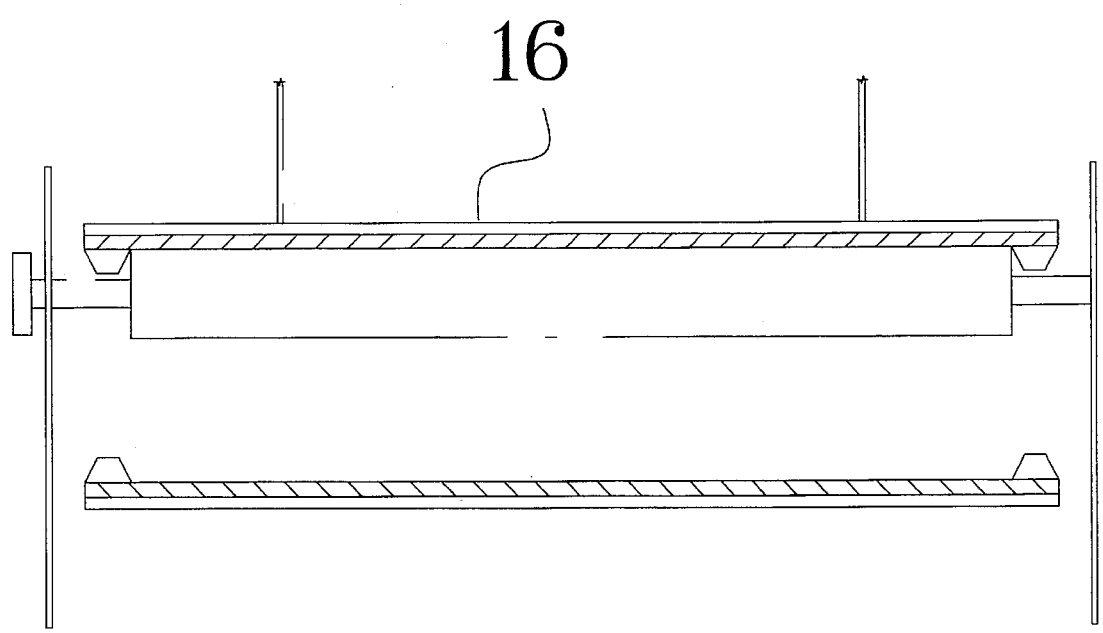
FIG. 5 is a view along lines 5—5 of FIG. 3.
Figure 6:
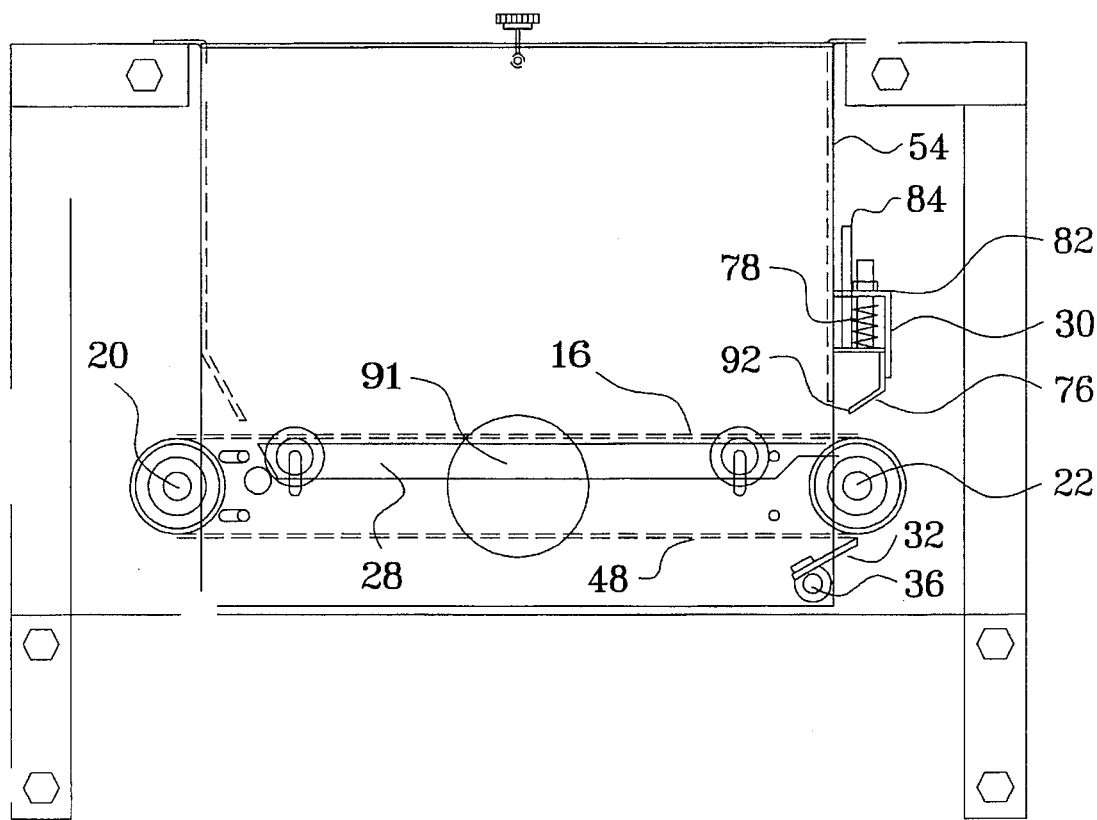
FIG. 6 is a front view of the duster of FIG. 3.
Figure 7:
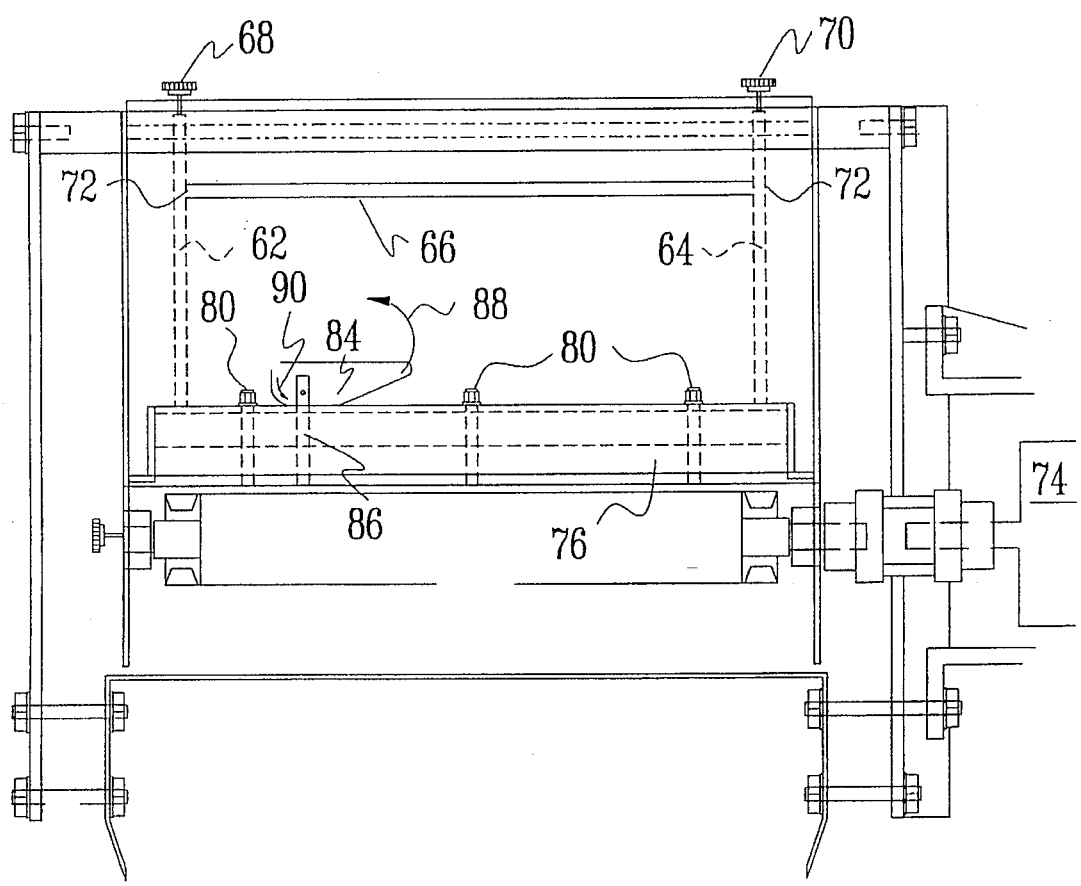
FIG. 7 is side view of the duster of FIG. 3.

A more detailed understanding of the present invention may be had with reference to FIGS. 2–7. Referring in particular to FIG. 2, bin 12 is defined by four walls 52, 54, 56 and 58. Flour is contained within compartment 60 defined between a pair of adjustable walls 62 and 64. Adjustable walls 62 and 64 slide on a post 66 rigidly secured to walls 56 and 58. Referring to FIG. 7, adjustable walls 62 and 64 are moved inward along rod 66 and held in position by the teightening of by a pair of Star knobs 68 and 70 which threadably engage walls 62 and 64 and bear against rod 66 urging them in frictional contact with rod 66 which passes through holes 72 in adjustable walls 62 and 64. In particular, during use the star knobs 68 and 70 are loosened and the position of the walls adjusted to the width and position of the dough sheet which one wishes to flour dust and the position of the walls are fixed using star knobs 68 and 70.

The system is driven by a motor 74 which drives roller 22 rotating conveyor belt 16.

As can be seen most clearly in FIG. 6, the gate 30 comprises a gate blade 76. The position of the gate is maintained in a spring-biased position by a spring assembly comprising springs 78 and a plurality of corresponding bolts 80 as can be seen most clearly in FIG. 7. The gate blade 76 is mounted on a gate support plate 82 which, in turn, is secured to wall 54. If desired, the system may be quickly cleaned by the raising of the gate blade. In particular, this is achieved through the use of a lever 84 mounted on a support stud 86. When lever 84 is rotated in the direction of arrow 88, it causes the face of lever 84 to rotate in the direction indicated by arrow 90, which, in turn, causes gate blade 76 to be pulled upwardly by springs 78 increasing the gap between the bottom edge of gate blade 76 and conveyor belt 16.

In order to provide for easy cleaning, a hole 91 is provided in the wall. A high pressure water hose may be inserted therein for easy cleaning of the unit with the water jet output of the hose.

Figure 8:
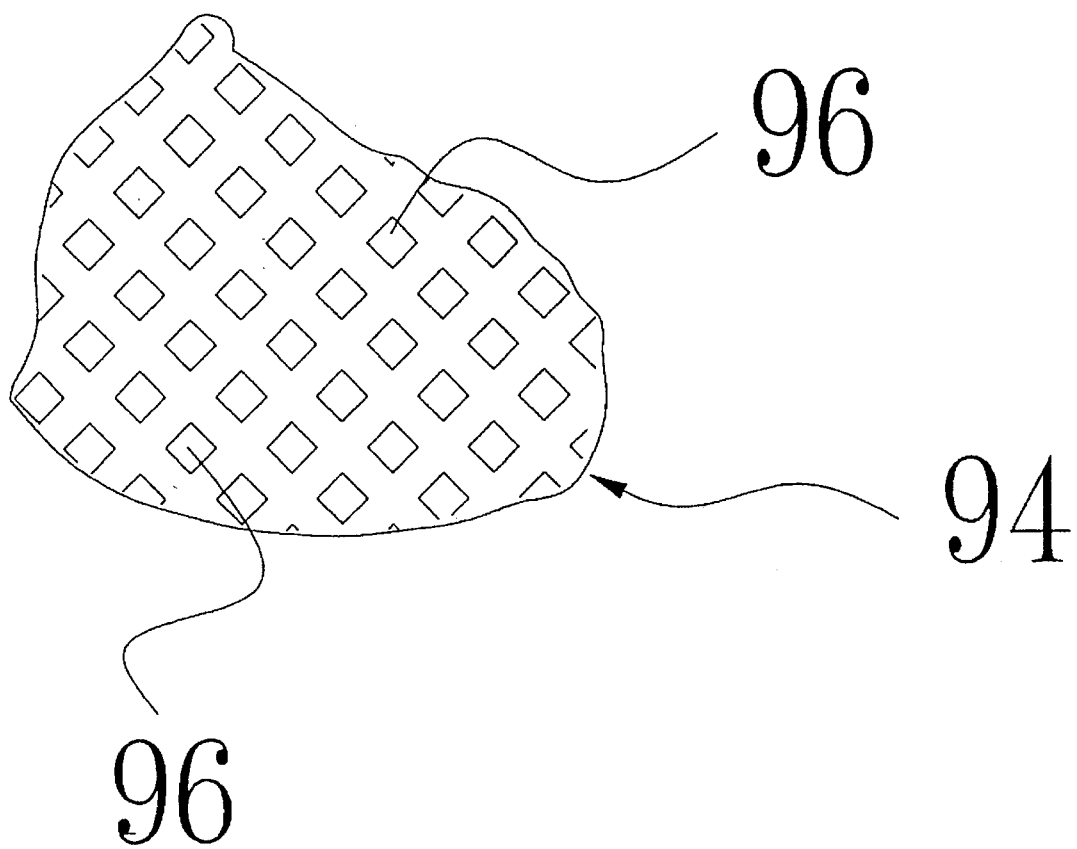
FIG. 8 is a view of an alternative conveyor belt.
Figure 1:
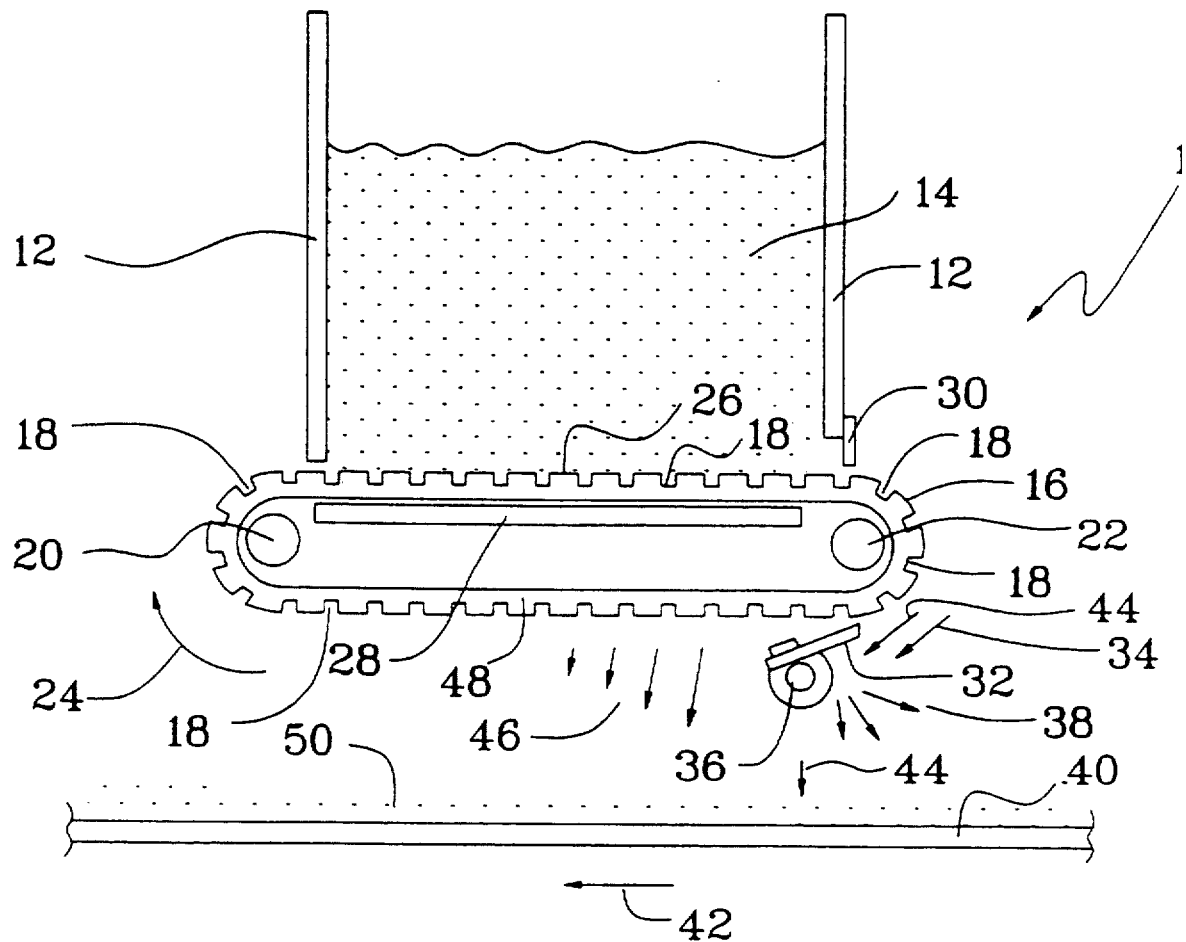
Figure 2:
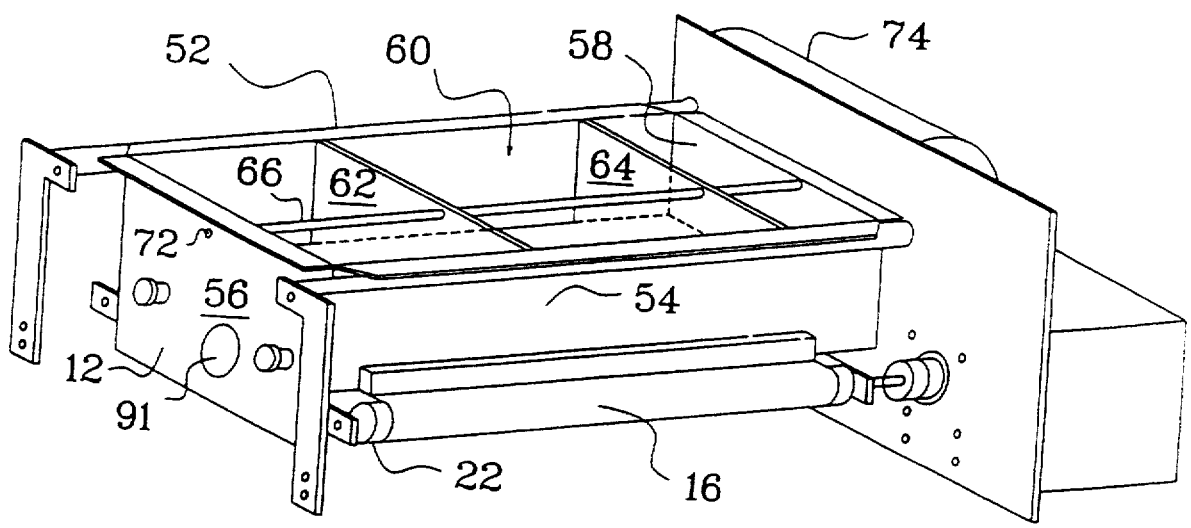
Figure 4:
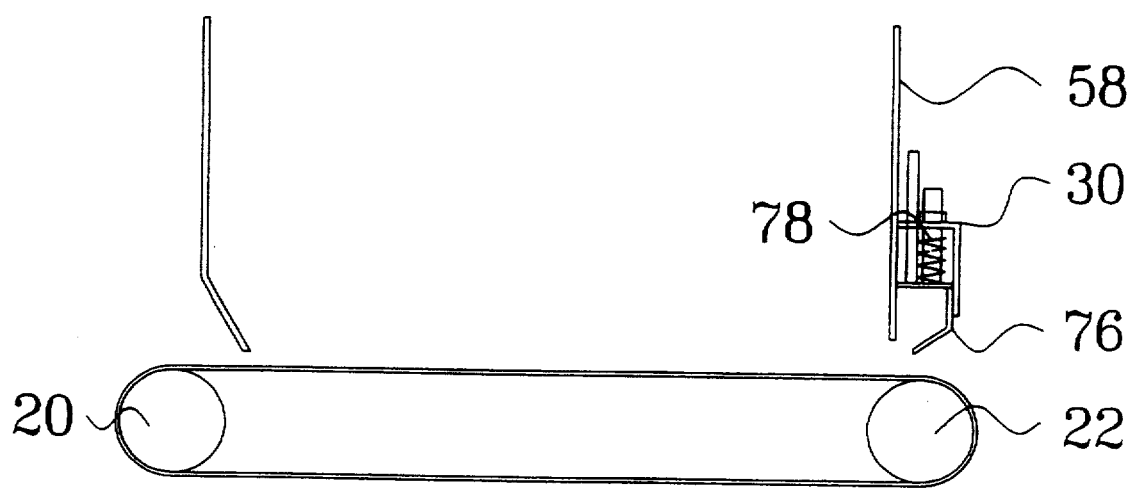
Figure 3:
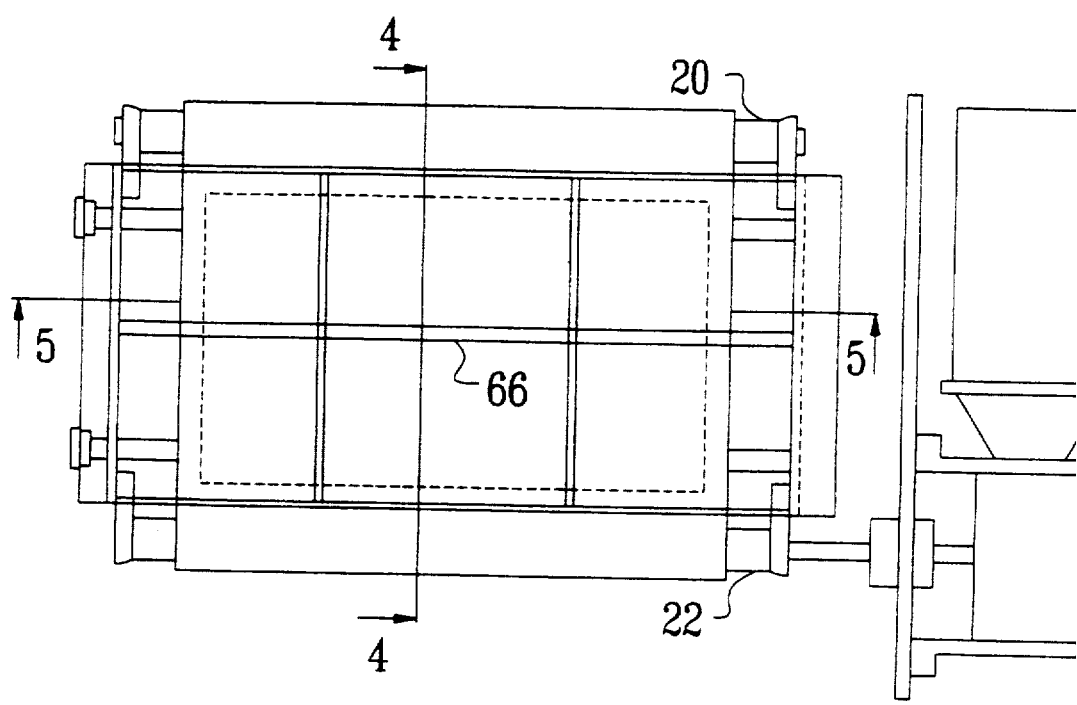
Figure 5:
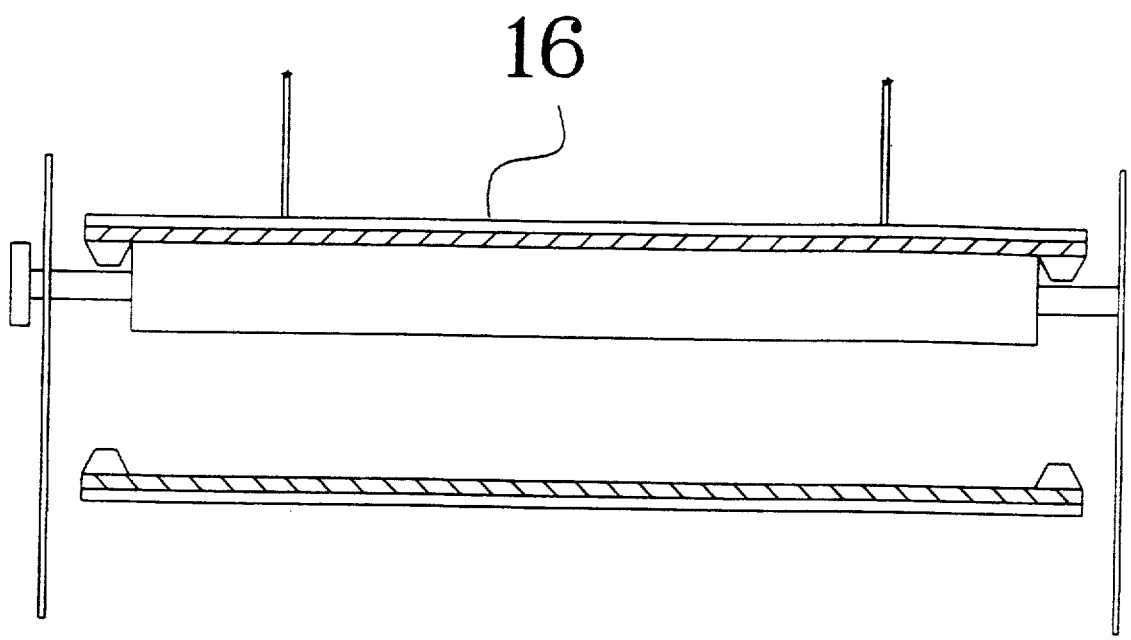
Figure 6:
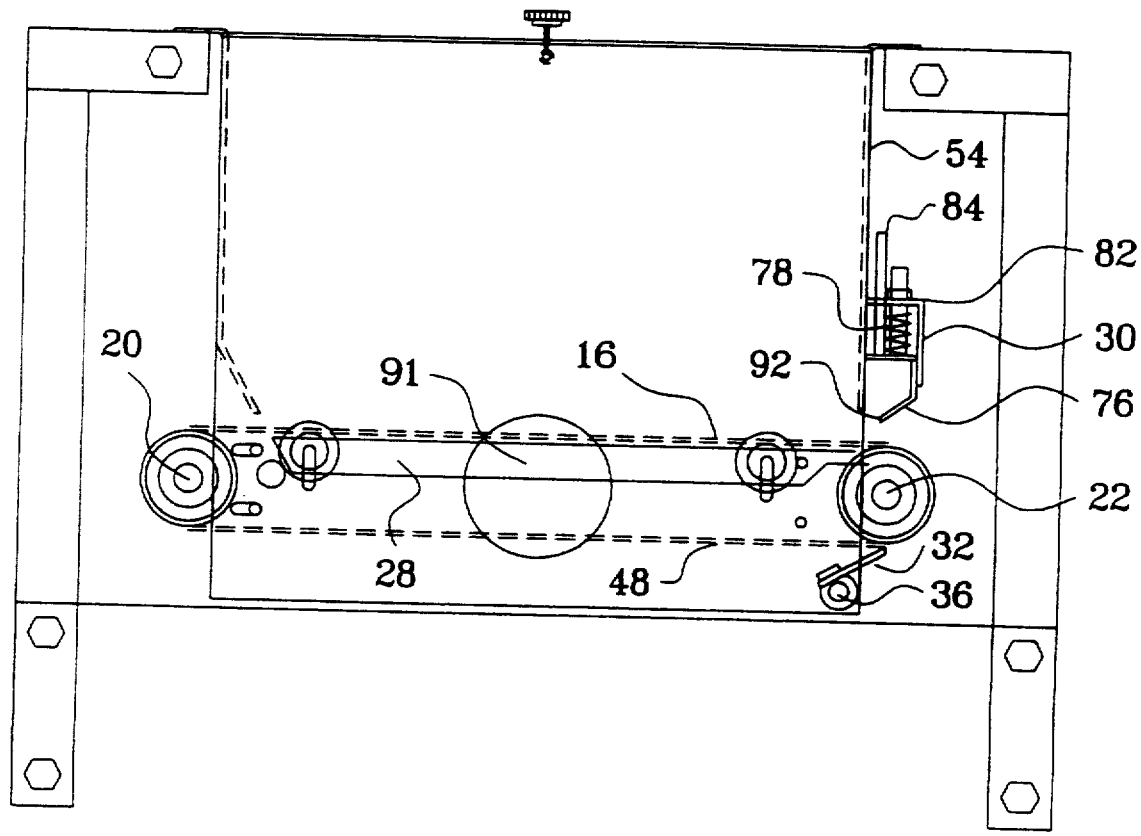
Figure 7:
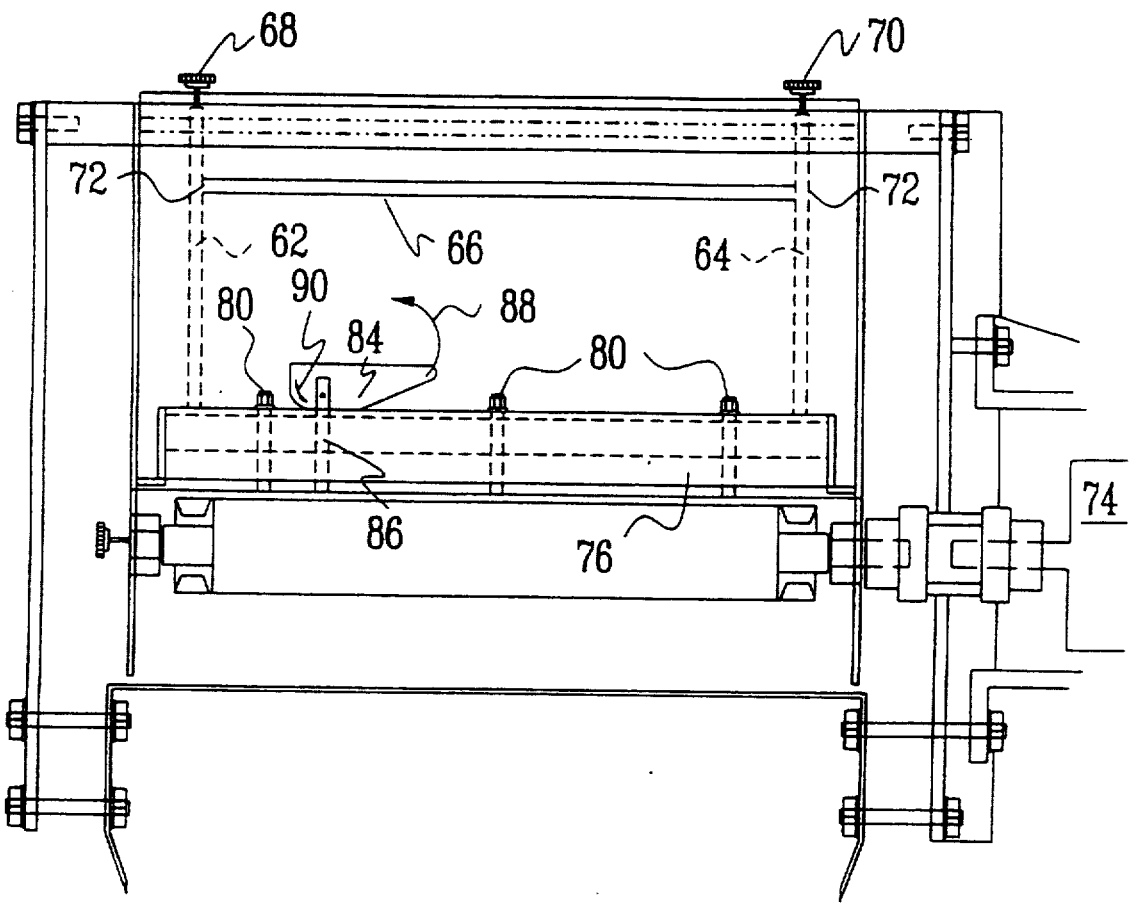
Figure 8:
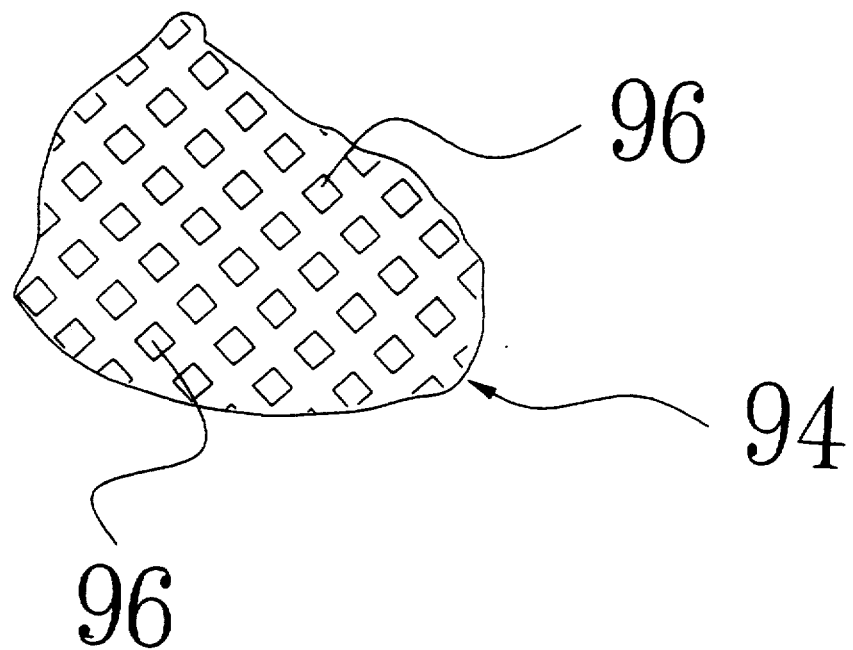
Figure 1:
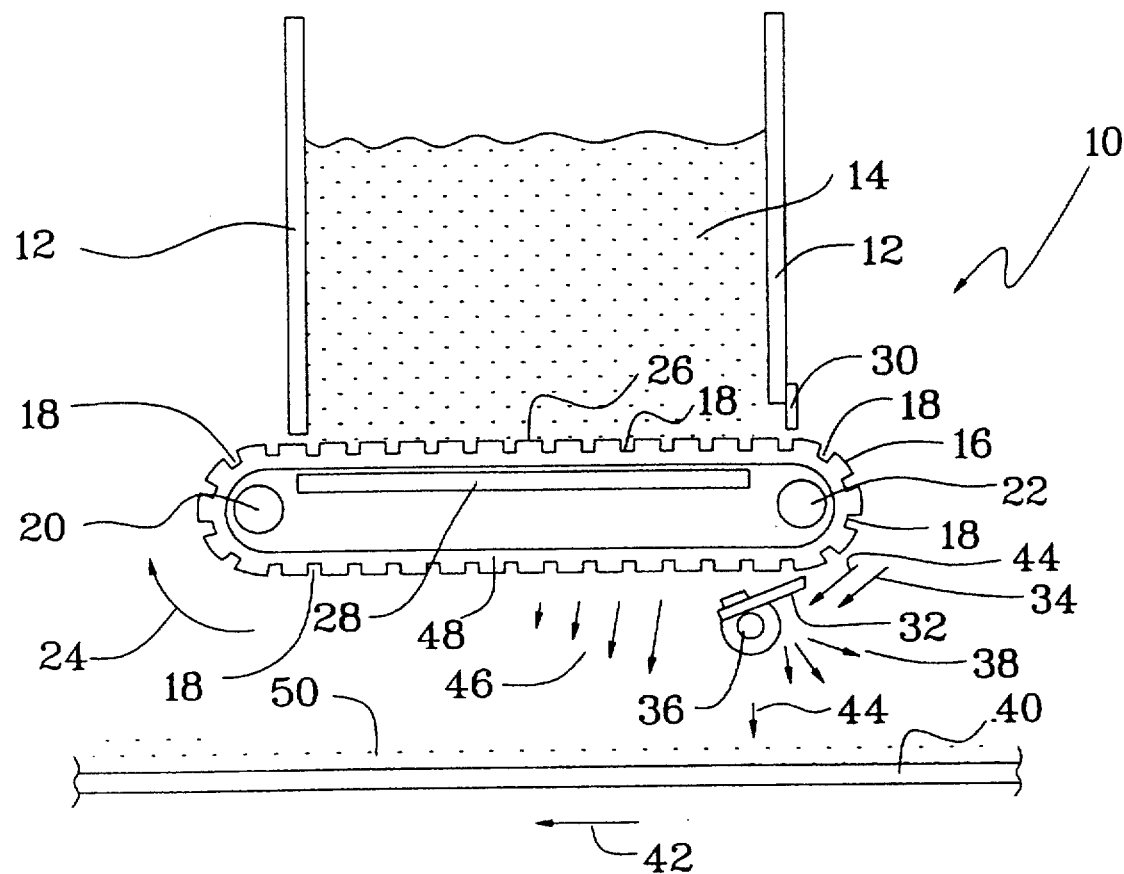
Figure 2:
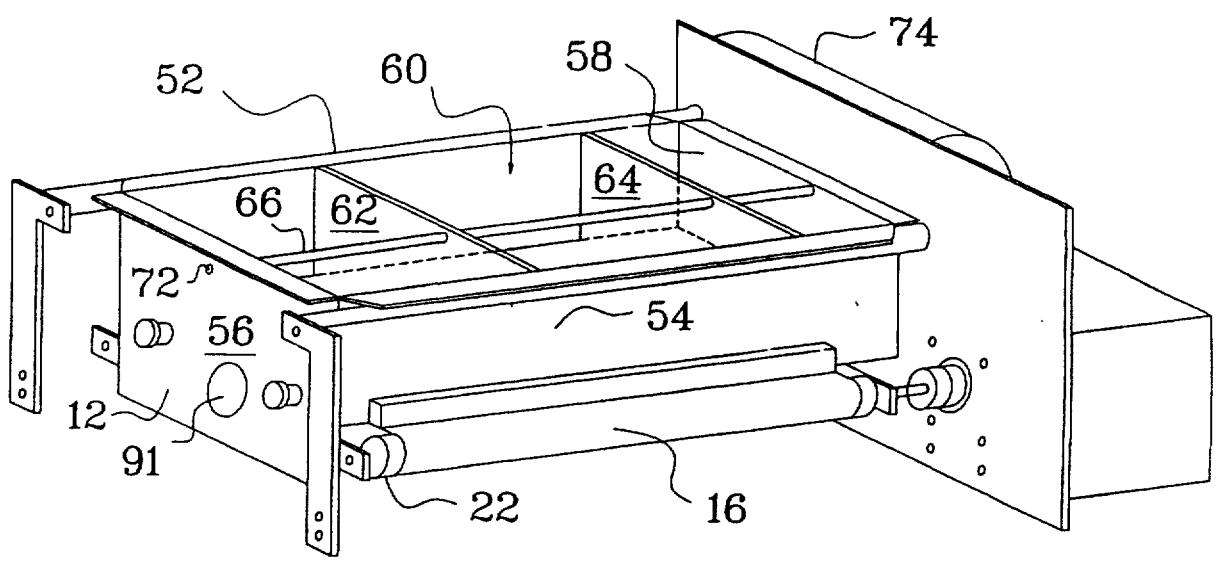
Figure 3:
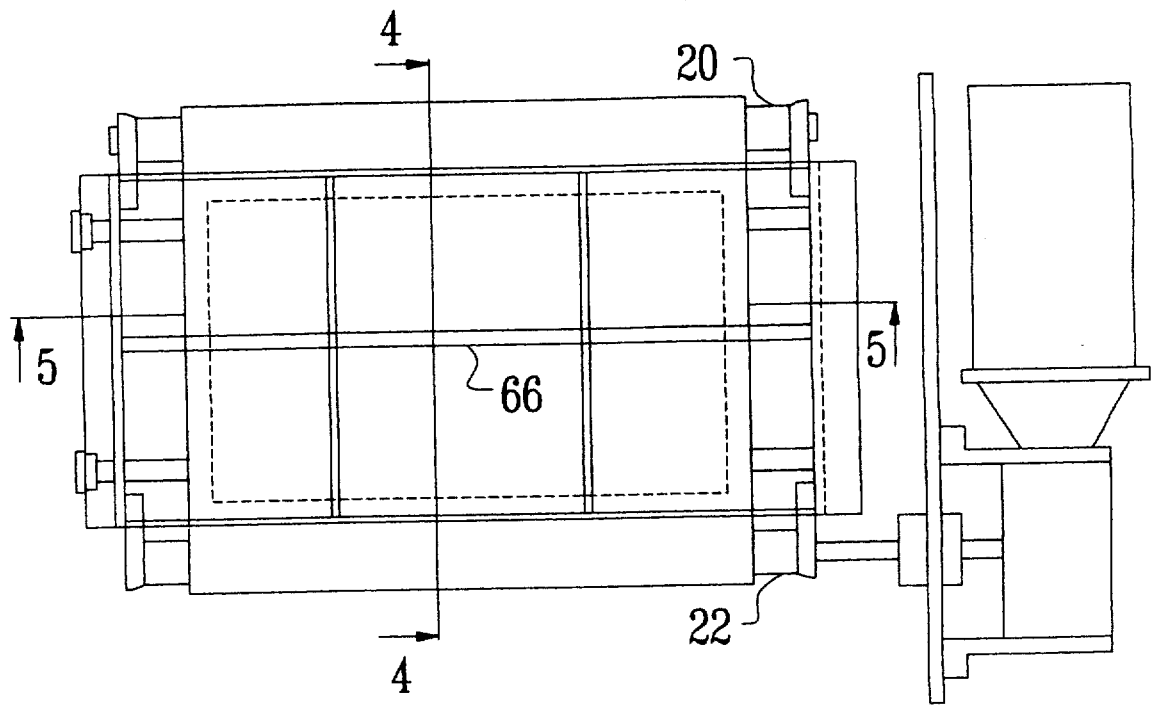
Figure 4:
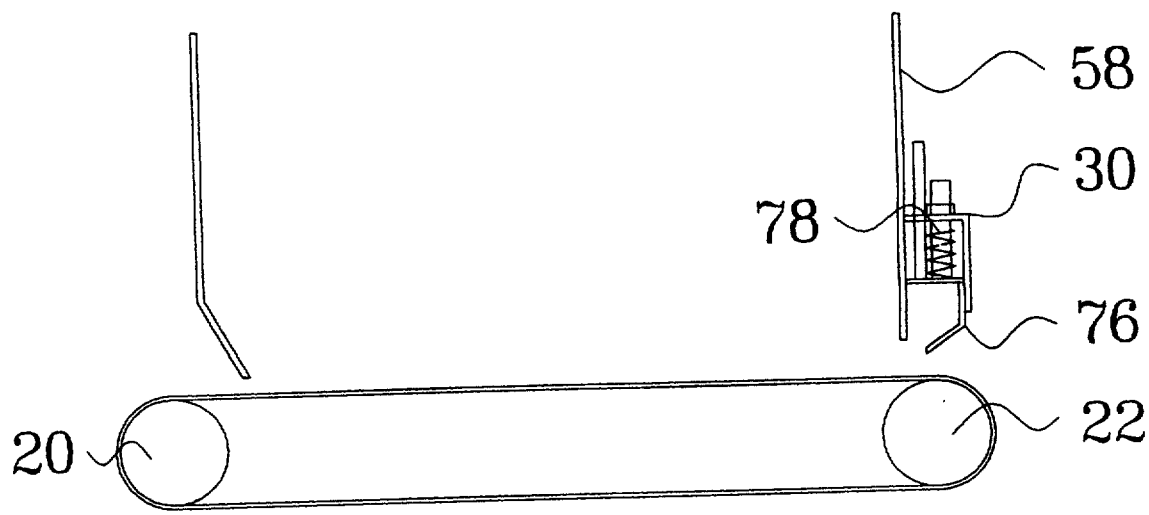
Figure 5:
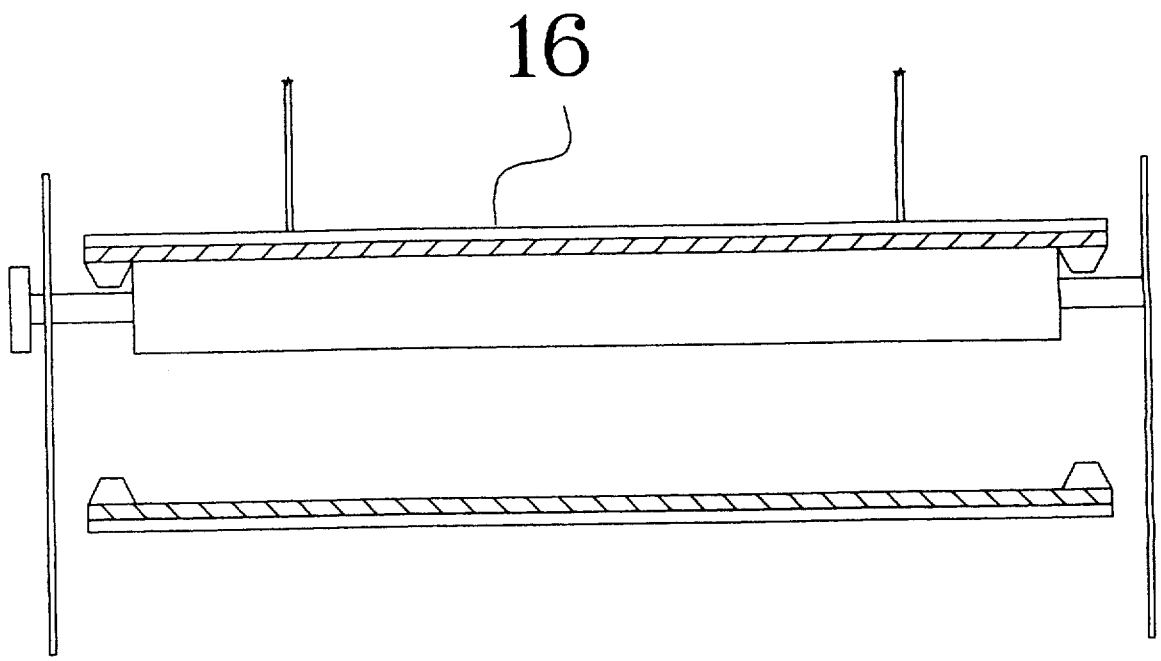
Figure 6:
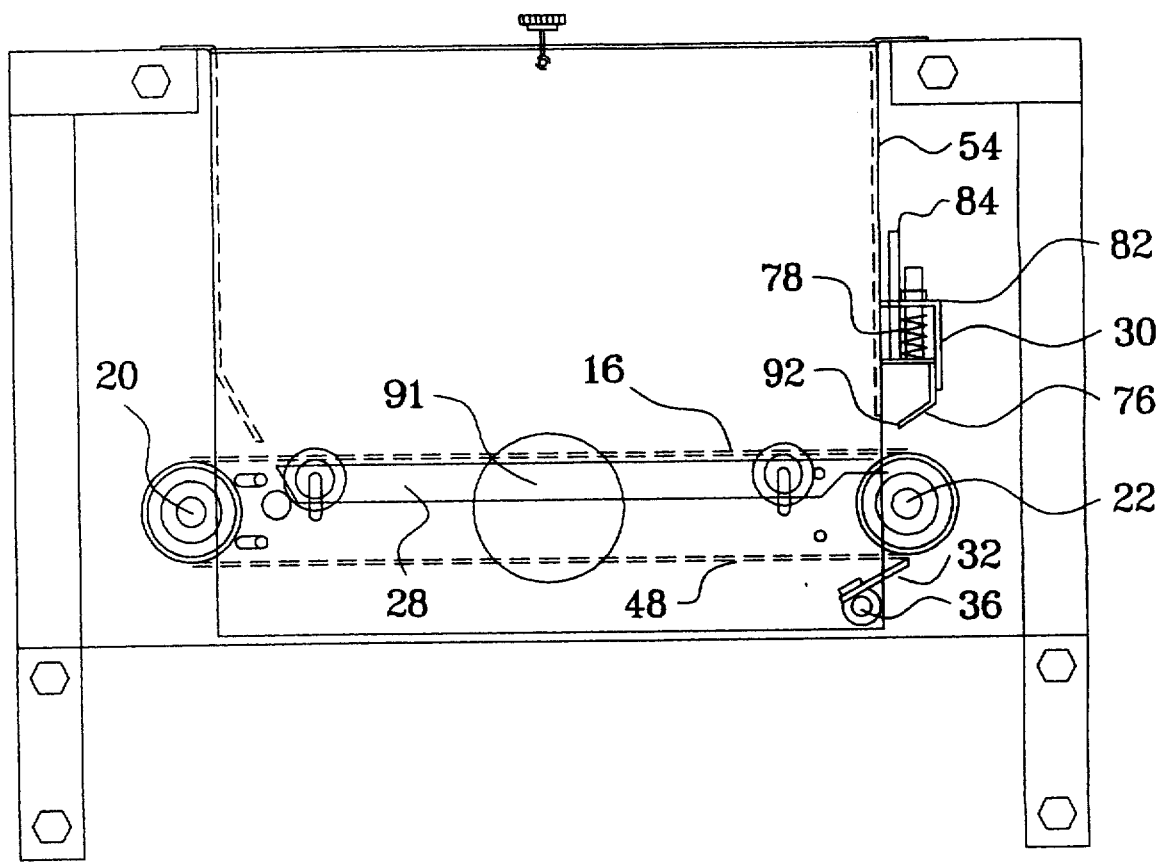
Figure 7:
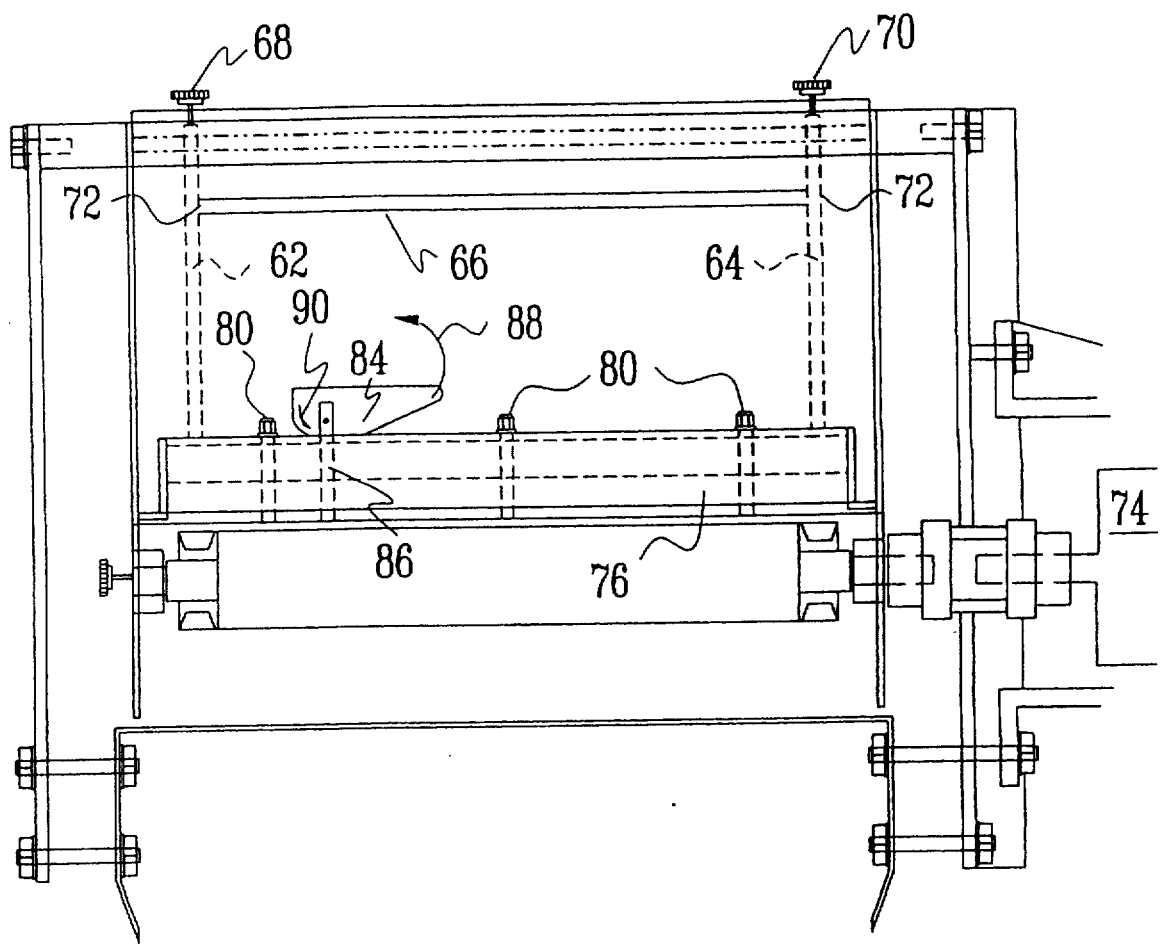
Figure 8:
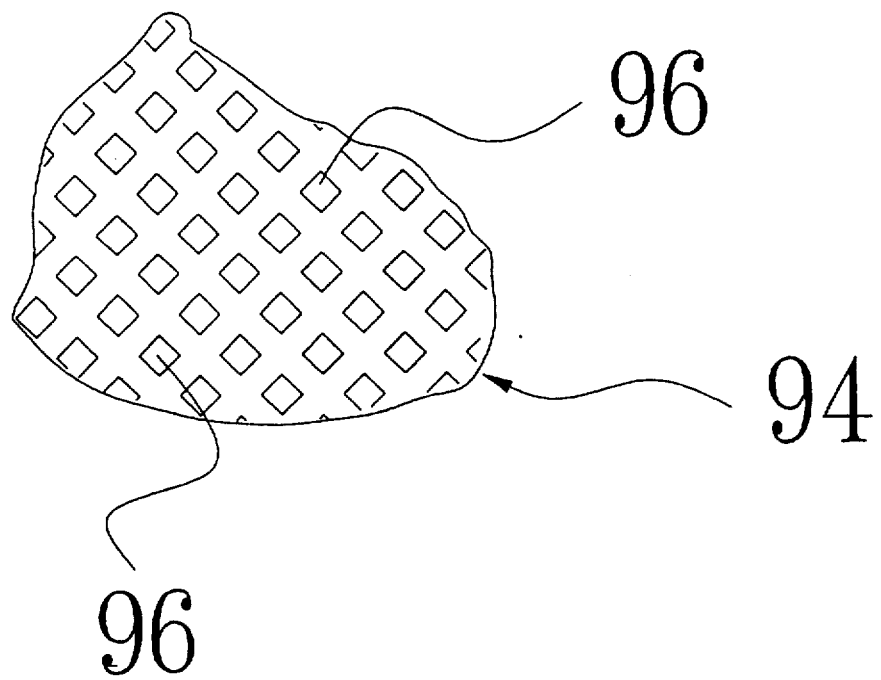

Referring to FIG. 8, an alternative conveyor belt is shown. This conveyor belt comprises a neoprene rubber conveyor belt 94 with its entire surface punched with diamond shaped holes 96.

While an illustrative embodiment of the invention has been described above, it is, of course, understood that various modifications will be apparent to those of ordinary skill in the art. Such modifications are within the spirit and scope of the invention, which is limited and defined only by the appended claims.

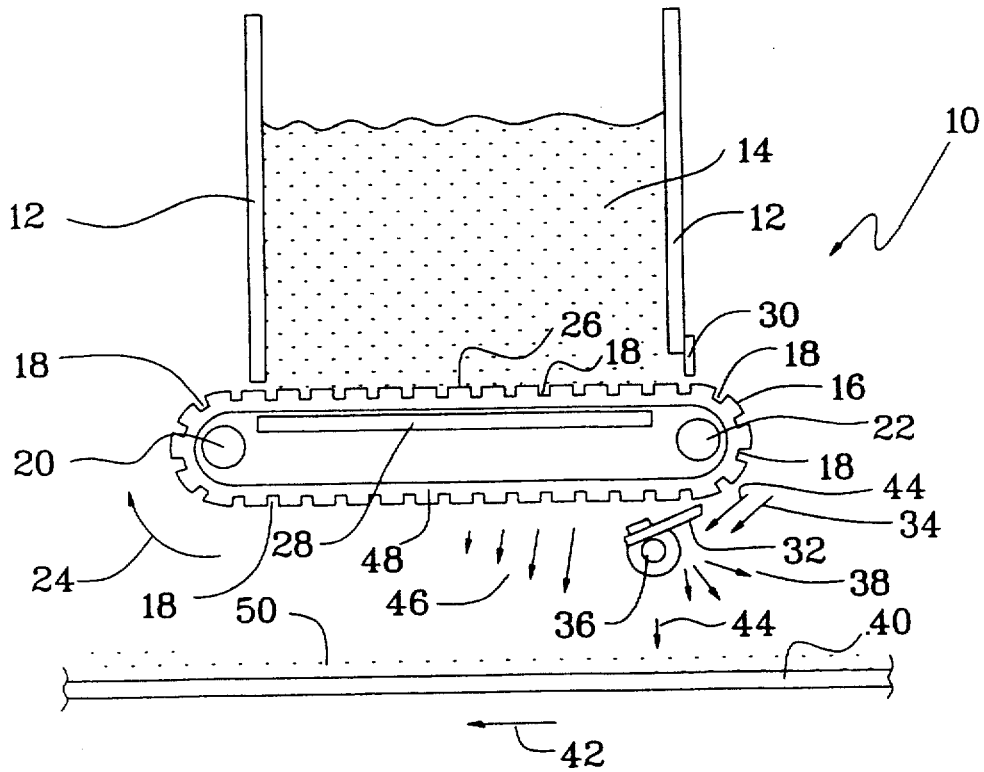

We claim:

1. A flour duster, comprising a bin for containing flour, said bin having a bottom, said bottom defining an opening for the output of flour contained therein, a conveyor-belt having a top and an underside, the bottom of said bin being supported above the top of said conveyor belt, structure for supporting said bin and said conveyor belt, said conveyor belt being positioned relative to said opening to substantially close said opening, and drive member coupled to said conveyor belt for rotating said conveyor belt to drag flour from said bin toward the underside of said conveyor belt and disperse said flour on a ribbon of dough positioned below said conveyor belt.

2. A flour duster as in claim 1, wherein the conveyor belt comprises a groove-shaped pattern.

3. A flour duster as in claim 1, wherein the conveyor belt has numerous holes punched in it.

4. A flour duster as in claim 3, wherein said holes are diamond shaped.

5. A flour duster as in claim 1, wherein one of the walls comprises an adjustable gate keeping the top of the conveyor belt clean and wherein said gate may be moved against a spring member by a lever to provide for easy cleaning.

6. A flour duster, comprising a bin for containing flour, said bin having a bottom, a conveyor belt having a top surface and an underside, the bottom of said bin being formed by the top surface of said conveyor belt, structure for supporting said bin and said conveyor belt, a drive member coupled to said conveyor belt for rotating said conveyor belt to drag flour from said bin toward the underside of said conveyor belt and disperse said flour on a ribbon of dough positioned below said conveyor belt, wherein the bin is formed of a plurality of walls and one of said walls at its lower portion comprises an adjustable gate which performs the function of scraping the top surface of the conveyor belt prior to the exit of said top surface of the belt exiting the from said bin.

7. A flour duster as in claim 6, wherein a doctor blade is positioned adjacent the underside of said conveyor to remove flour that may accumulate on the conveyor belt.

8. A flour duster as in claim 7, wherein said bin is comprised of side walls and has a width and said width of the bin is adjustable by a pair of side walls which are adjustably locked in place relative to each other by a pair of threaded members or equivalent structure.

9. A flour duster as in claim 7, wherein flour removed by the doctor blade is caused to fall upon a support which supports the doctor blade thereby dispersing the flour into a uniform dust for deposit on the ribbon of dough.

10. A flour duster as in claim 6, wherein said bin is comprised of side walls and has a width and said width of the bin is adjustable by a pair of side walls which are adjustably locked in place relative to each other by a pair of threaded members or equivalent structure.

11. A flour duster as in claim 7, wherein the conveyor belt comprises a groove-shaped pattern.

12. A flour duster as in claim 7, wherein the conveyor belt has numerous holes punched in it.

13. A flour duster as in claim 12, wherein said holes are diamond shaped.

14. A flour duster as in claim 7, wherein a support plate underlies the top surface of the conveyor belt to give it rigidity under the weight of the flour in the bin.

15. A flour duster as in claim 7, wherein one of the walls comprises an adjustable gate keeping the top of the conveyor belt clean and wherein said gate may be moved against a spring member by a lever to provide for easy cleaning.

16. A flour duster, comprising a bin for containing flour, said bin having a bottom, a conveyor belt having a top surface and an underside, the bottom of said bin being formed by the top surface of said conveyor belt, structure for supporting said bin and said conveyor belt, a drive member coupled to said conveyor belt for rotating said conveyor belt to drag flour from said bin toward the underside of said conveyor belt and disperse said flour on a ribbon of dough positioned below said conveyor belt and a doctor blade positioned adjacent the underside of said conveyor to remove flour that may accumulate on the conveyor belt.

17. A flour duster as in claim 16, wherein flour removed by the doctor blade is caused to fall upon a support which supports the doctor blade thereby dispersing the flour into a more uniform dust for deposit on the ribbon of dough.

18. A flour duster, comprising a bin for containing flour, said bin having a bottom, a conveyor belt having a top surface and an underside, the bottom of said bin being formed by the top surface of said conveyor belt, structure for supporting said bin and said conveyor belt, a drive member coupled to said conveyor belt for rotating said conveyor belt to drag flour from said bin toward the underside of said conveyor belt and disperse said flour on a ribbon of dough positioned below said conveyor belt, wherein said bin is comprised of side walls and has a width and said width of the bin is adjustable by a pair of side walls which are adjustably locked in place relative to each other by a pair of threaded members or equivalent structure.

19. A flour duster, comprising a bin for containing flour, said bin having a bottom, a conveyor belt having a top surface and an underside, the bottom of said bin being formed by the top surface of said conveyor belt, structure for supporting said bin and said conveyor belt, a drive member coupled to said conveyor belt for rotating said conveyor belt to drag flour from said bin toward the underside of said conveyor belt and disperse said flour on a ribbon of dough positioned below said conveyor belt and a support plate underlying the top surface of the conveyor belt to give it rigidity under the weight of the flour in the bin.

* * * * *

UNITED STATES PATENT AND TRADEMARK OFFICE
CERTIFICATE OF CORRECTION

PATENT NO. : 5,553,533
DATED : Sep. 10, 1996
INVENTOR(S) : Christopher J. Loechtenfeldt, et al It is certified that error appears in the above-indentified patent and that said Letters Patent is hereby corrected as shown below:

The title page, showing an illustrative figure, should be deleted and substitute therefor the attached title page.

Delete drawing sheets 1-8, and substitute therefor the drawing sheets, consisting of Figs. 1-8, as shown on the attached pages.

Signed and Sealed this

Eighth Day of April, 1997

Attest:

BRUCE LEHMAN

Attesting Officer

Commissioner of Patents and Trademarks

United States Patent [19]
Loechtenfeldt et al.

[11] Patent Number: 5,553,533
[45] Date of Patent: Sep. 10, 1996

[54] FLOUR DUSTER

[75] Inventors: Christopher J. Loechtenfeldt, Cincinatti; Bernardus W. Muller, Loveland, both of Ohio

[73] Assignee: Interko, Inc., Blythewood, S.C.

[21] Appl. No.: 327,358

[22] Filed: Oct. 21, 1994

[51] Int. Cl.⁶ ............................................. A23B 4/02
[52] U.S. Cl. ................................... 99/494; 118/19
[58] Field of Search ............................ 99/494; 118/13, 118/19, 77, 76, 322, 309

[56] References Cited

U.S. PATENT DOCUMENTS

| | | |
|---|---|---|
| 4,210,074 | 7/1980 | Laughman ........................ 99/494 |
| 4,448,116 | 5/1984 | Muzzarelli ........................ 99/494 |
| 4,715,315 | 12/1987 | Burford ........................... 99/494 |
| 5,160,377 | 11/1992 | Montemayor et al. ............. 99/494 |
| 5,165,331 | 11/1992 | Hayashi et al. .................. 99/494 |

*Primary Examiner*—David Scherbel
*Assistant Examiner*—Reginald L. Alexander
*Attorney, Agent, or Firm*—Handal & Morofsky

[57] ABSTRACT

There is provided a flour duster having a bin for containing flour, the bin having a bottom, a conveyor belt having a top surface and an underside, the bottom of the bin being formed by the top surface of the conveyor belt, structure is provided for supporting the bin and the conveyor belt, a drive member coupled to the conveyor belt for rotating the conveyor belt to drag flour from the bin toward the underside of the conveyor belt and disperse the flour.

19 Claims, 8 Drawing Sheets

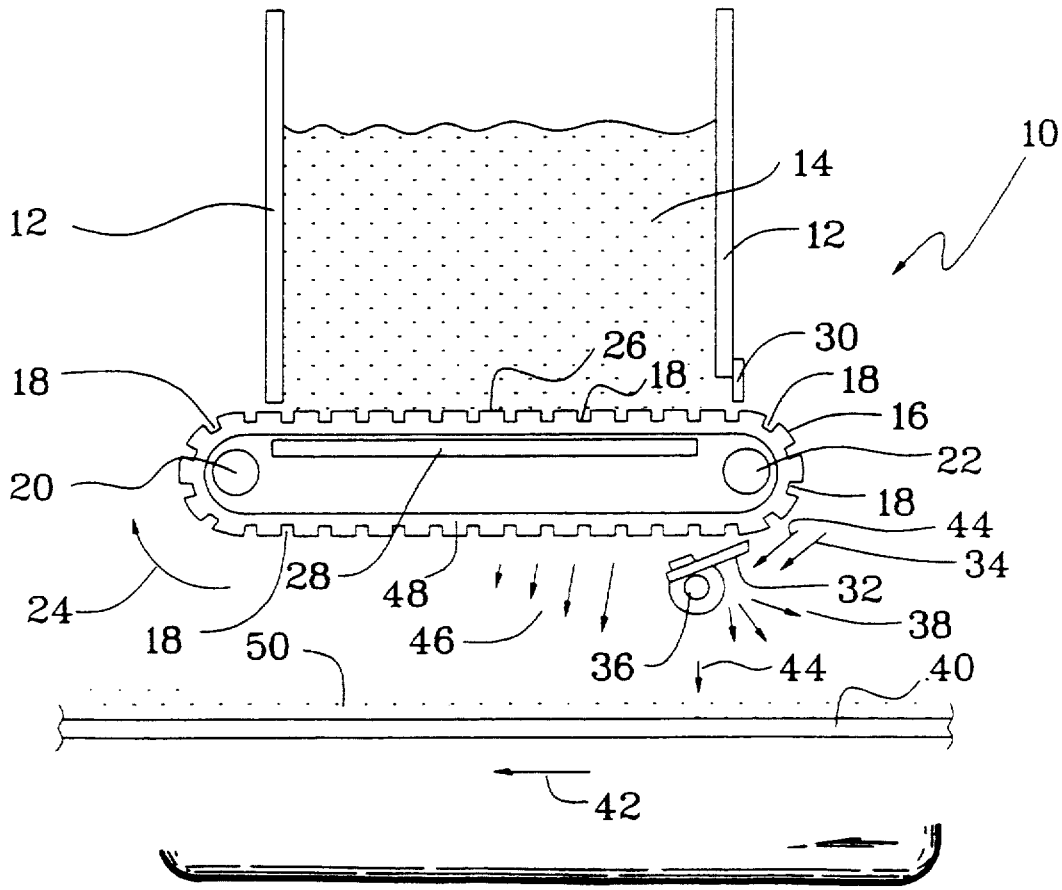

UNITED STATES PATENT AND TRADEMARK OFFICE
CERTIFICATE OF CORRECTION

PATENT NO. : 5,553,533
DATED : Sep. 10, 1996
INVENTOR(S) : Christopher J. Loechtenfeldt, et al It is certified that error appears in the above-indentified patent and that said Letters Patent is hereby corrected as shown below:

The title page, showing an illustrative figure, should be deleted and substitute therefor the attached title page.

Delete drawing sheets 1-8, and substitute therefor the drawing sheets, consisting of Figs. 1-8, as shown on the attached pages.

This certificate supersedes Certificate of Correction issued April 8, 1997.

Signed and Sealed this

Nineteenth Day of August, 1997

Attest:

BRUCE LEHMAN

Attesting Officer

Commissioner of Patents and Trademarks

United States Patent [19]
Loechtenfeldt et al.

[11] Patent Number: 5,553,533
[45] Date of Patent: Sep. 10, 1996

[54] FLOUR DUSTER

[75] Inventors: Christopher J. Loechtenfeldt, Cincinatti; Bernardus W. Muller, Loveland, both of Ohio

[73] Assignee: Interko, Inc., Blythewood, S.C.

[21] Appl. No.: 327,358

[22] Filed: Oct. 21, 1994

[51] Int. Cl.[6] ................................................ A23B 4/02
[52] U.S. Cl. ........................................ 99/494; 118/19
[58] Field of Search ........................... 99/494; 118/13, 118/19, 77, 76, 322, 309

[56] References Cited

U.S. PATENT DOCUMENTS

| | | | |
|---|---|---|---|
| 4,210,074 | 7/1980 | Laughman | 99/494 |
| 4,448,116 | 5/1984 | Muzzarelli | 99/494 |
| 4,715,315 | 12/1987 | Burford | 99/494 |
| 5,160,377 | 11/1992 | Montemayor et al. | 99/494 |
| 5,165,331 | 11/1992 | Hayashi et al. | 99/494 |

*Primary Examiner*—David Scherbel
*Assistant Examiner*—Reginald L. Alexander
*Attorney, Agent, or Firm*—Handal & Morofsky

[57] ABSTRACT

There is provided a flour duster having a bin for containing flour, the bin having a bottom, a conveyor belt having a top surface and an underside, the bottom of the bin being formed by the top surface of the conveyor belt, structure is provided for supporting the bin and the conveyor belt, a drive member coupled to the conveyor belt for rotating the conveyor belt to drag flour from the bin toward the underside of the conveyor belt and disperse the flour.

19 Claims, 8 Drawing Sheets